April 23, 1968  R. J. KEADY ET AL  3,379,397
ADJUSTABLE FLEXIBLE MOUNTING FOR ROTATING EQUIPMENT
Filed May 26, 1966
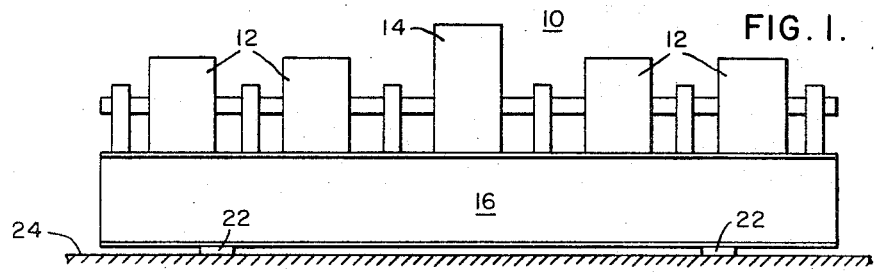
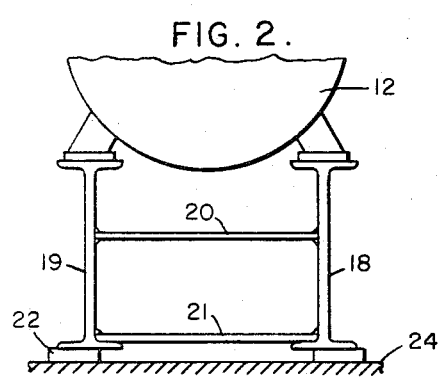
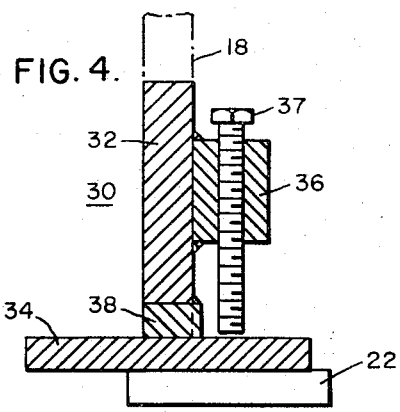
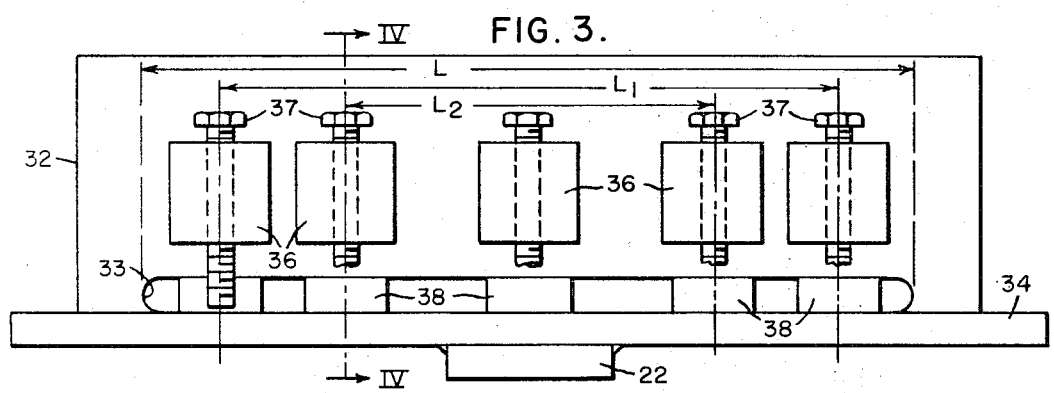
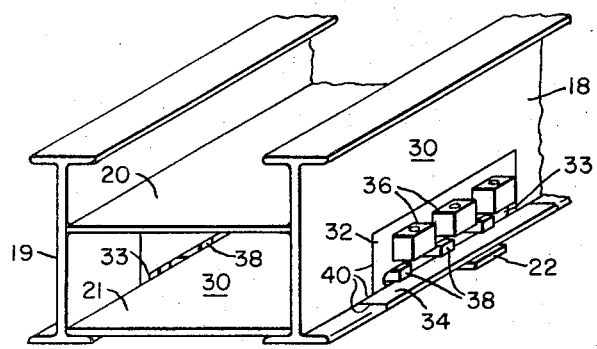
INVENTORS
Sigrud R. Petersen &
Richard J. Keady
BY
ATTORNEY

United States Patent Office 3,379,397
Patented Apr. 23, 1968

3,379,397
ADJUSTABLE FLEXIBLE MOUNTING FOR ROTATING EQUIPMENT
Richard J. Keady, Monroeville, and Sigrud R. Petersen, North Huntingdon Township, Irwin, Pa., assignors to Westinghouse Electric Corporation, Pittsburgh, Pa., a corporation of Pennsylvania
Filed May 26, 1966, Ser. No. 553,221
4 Claims. (Cl. 248—20)

ABSTRACT OF THE DISCLOSURE

A means for detuning a rigid support structure supporting rotating equipment on mounting pads disposed on a foundation structure. The detuning means includes slotted resilient steel pieces fixed in the rigid support structure at locations over the mounting pads so that the metal between the slot and the pads functions as a spring means. By inserting and removing blocks in and out of the slots, the spring constant of the steel piece, and consequently that of the support structure and associated system using the rotating equipment, is changed thereby isolating the rotating equipment from the natural frequencies of the system.

---

The presnt invention relates generally to mounting structures for rotating machines and shafts and particularly to unique machine mountings having a simple and economical means for changing the natural frequency of the system of which the machine is a part and thereby avoiding a vibration condition in the system that is resonant with the rotating machines.

The present practice in the manufacture of motor-generator sets for shovel and dragline application is to use a rigid bedplate structure, usually made from wide flange beams, supported at three or four points on mounting pads disposed between the bottom of the beams and the cab frame or foundation platform. This rigid structure is supported and designed to isolate the rotating equipment and bedplate from the distortion of the cab which occurs with normal operation. That is, due to the extreme rigidity of the bedplate structure, deflection is insignificant with mechanical loading encountered in service. In addition, the bedplate is designed to have no natural frequencies at or near the operating frequencies of the rotating equipment. This requirement alone is difficult to meet because the motor-generator set, in the final analysis, is mounted on a relatively "soft" foundation, namely, the foundation platform of the shovel cab. The effect of the cab foundation is further difficult to predict because of the complexity of the cab structure and an inability to accurately calculate and determine its natural frequency. Errors of 40 percent in this type of calculation are not uncommon.

In designing to meet all of the problems and requirements noted above, the bedplate structure becomes a very costly item. Further, once the bedplate has been manufactured, changes of a nature which will alter the natural frequencies of the system are practically impossible.

Shovel manufacturers, recognizing that the shovel foundation is a significant but unknown quantity in predicting successful operation of the rotating equipment with regard to avoiding natural frequencies close to (rotating) operating frequencies, are attempting to avoid future problems by demanding that motor-generator set manufacturers design their equipment to have no natural frequency less than 25% removed from the operating frequency. This demand further increases the design complexity and therefore the cost of the sets.

The present disclosure describes an economical yet extremely effective means for detuning the overall system and thereby assuring the customer and user of positive corrective action if and when required. Briefly, the present invention comprises an adjustable spring means integral with the bedplate structure, and located at the points of the mounting pads. The adjustable spring means is essentially the beam metal located under an elongated opening or slot provided in each of the wide flange beams at locations over the mounting pads the spring means being made adjustable by, removable blocking means inserted in the openings. The blocking means may take the form of stacks of shims (shim packs), solid metal blocks or the like. Each full stack or block in the elongated opening supports a portion of the weight of the motor-generator set. With all shim packs in place, no flexibility exists in the system due to the spring device described here. However, as the shim packs or blocks are removed from the openings, the effective length and therefore the spring constant) of the bedplate is changed by virtue of the resiliency of the metal beam existing under the elongated openings and over the mounting pads. To insure a resilient characteristic suitable for the weight and stress encountered in shovel and dragline apparatus, the elongated slot is preferably provided in an insert fabricated from the proper steel stock and secured in cutout portions located in each of the wide flange beams. The cutout portions would of course be located over the area of the support pads with the spring steel inserts suitably secured in the wide flange beams such as by welding.

Therefore an object of the present invention is to provide a simple, efficient and effective means for avoiding a resonant condition in a system using rotating equipment.

Another object of the invention is to provide a unique, positive means for altering the natural frequencies of a system using rotating equipment.

A more specific object of the invention is to provide adjustable spring constants in the support structure of a motor-generator set that will allow substantial disregard of the ambiguous and unknown quantities of a shovel or dragline cab structure affecting its natural frequency of vibration or any other situation resulting in undesirable system vibration.

A further object of the invention is to provide a low cost spring constant adjusting means that will allow motor-generator sets to be designed without substantial regard for critical frequencies of the system employing the sets.

Yet another object of the invention is to provide a novel means for changing a troublesome frequency by the simple use of blocking means in a slot located in a supporting srtucture.

These and other objects of the invention will become more apparent from the following detailed description taken in connection with the accompanying drawing, in which:

FIGURE 1 is a diagrammatic side elevation view of a typical motor-generator set used in large shovel apparatus;

FIG. 2 is an end elevation view of the supporting bedplate structure shown in FIG. 1;

FIG. 3 is a side elevation view of the unique adjustable spring means constructed in accordance with the principles of the present invention;

FIG. 4 is a cross sectional view of the unique spring means taken along line IV—IV of FIG. 3; and FIG. 5 is a partial perspective view of the bedplate structure shown in FIG. 2 with the unique spring means disposed in place therein in accordance with the principles of the present invention.

Specifically, there is shown somewhat diagrammatically in FIG. 1 a motor-generator set 10 used in large equipment (not shown) such as shovel and dragline equipment. The set includes a plurality of generators 12 mounted in line with and powered by a motor 14 centrally disposed between the generators. The motor and generators are securely mounted on a bedplate structure 16 which generally comprises two spaced apart wide flange steel beams 18 and 19 (FIG. 2) secured together in parallel relationship by two elongated steel plates 20 and 21 extending the length of the wide flange beams, as best seen in FIG. 5. Plates 20 and 21 can be welded or otherwise secured to the inside of beams 18 and 19 as shown in FIG. 2. On the top flanges of the beams rest generators 12 and motor 14, FIG. 2 showing diagrammatically the supporting foot structures of one of the generators disposed on the top beam flanges.

Motor-generator set 10, including bedplate structure 16, is disposed on a foundation platform 24 forming a part of the shovel cab structure, and is supported on pads 22 disposed between the platform and the bottom wide flanges of bedplate beams 18 and 19 as best seen in FIG. 2. Bolt means (not shown) can be used to secure bedplate 16 to cab platform 24 with mounting pads 22 welded to bedplate 16 and ordinarily providing the only support points for bedplate structure 16.

As can be readily seen from FIGS. 1 and 2, the structure and nature of foundation platform 24 will have a direct effect on the operation of the motor-generator set. That is, pads 22 may be disposed and bedplate 16 designed to have no natural frequencies at or near the operating frequencies of the rotating equipment, and the bedplate may be further built extremely rigid in an effort to isolate the rotating equipment from vibrations occurring in the structure of the shovel cab as mentioned earlier. The cab structure, however, is not a simple, fixed parameter which designers may use as a constant in calculating accurate and useful results. That is, the vibratory effect of the cab foundation on rotating equipment is difficult to predict because of the complexity of the cab structure. Further, foundation structures 24 usually consist of a large piece of sheet steel covering a frame (not shown) along its borders so that the sheet steel is "soft" and flexes in accordance with mechanical loading encountered in service. The possibilities of sustained, deleterious oscillations in such a structure are quite obvious. In other words, the spring constant of the shovel foundation is an unknown and sometimes variable quantity that can result in an unfavorable vibration situation. As is further evident from FIGS. 1 and 2, once bedplate 16 is fabricated, changes of a nature which will alter its natural frequencies are very difficult; the massive, welded structure 16 is obviously not amenable to modification in order to obviate unwanted, detrimental vibration occurring in the system.

FIGS. 3 and 4 show a simple and economical means incorporated in the bedplate structure for providing adjustable spring constants that allow detuning of the system described above. This is accomplished by a variable spring means 30 comprising an inverted steel T-section having an upwardly extending shank portion 32 and a laterally extending base portion 34 perpendicular to the shank portion. Spring means (T-sections) 30 are made and machined to be inserted and secured in cutout sections 40 provided in the lower shank and flange portions of beams 18 and 19 as seen in FIG. 5. Cutout sections 40 are so located in the beams that spring T-sections 30 will be substantially centrally located over mounting pads 22 as seen in FIG. 3 for reasons to be explained hereinafter. T-sections 30 take generally the shape of the wide flange beams 18 and 19 and thus can easily be welded in place to the beams and suitably secured to pads 22 and shovel platform 24. Each T-section 30 is further preferably made from a resilient steel stock for service as a spring means within the wide flange beams of bedplate 16.

As best seen in FIG. 3, T-section 30 is provided with an elongated slot 33 in the lower portion of upright or shank portion 32 adjacent laterally extending portion or base 34. When T-section 30 is secured in place in bedplate 16 and centrally disposed over mounting pad 22, slot 33 allow base 34 to flex upwardly in the area of the slot. Thus, lateral base portion 34 under slot 33 functions as a spring means when opposing forces are exerted through upright portion 32 and pad 22 such as would occur with vibratory motion in the cab structure and platform 24.

In order to change the effective length L of slot 33 (FIG. 3), and therefore the spring constant of T-section 30 and foundation 24, blocking means 38 are disposed in slot 33 as shown. Means 38 can take the form of solid blocks as shown in FIGS. 3 and 4 though the invention is not limited thereto. An empty slot 33 (containing no blocks), which can be machined in T-section 30, results in a section length L which supports a portion of the weight of motor-generator set 10 equal to the total weight of set 10 divided by the number of support pads 22. For example, with four pads 22, the weight supported by a single slot 33 would be one fourth the total weight of the motor-generator set. Thus, with no blocks 38 disposed in slot 33, the spring constant (K) is equal to $$K = \frac{C_1 EI}{L^3}$$

where $C_1$ is a constant, E is the modulus of elasticity in tension of the spring material, I is the moment of inertia of base 34 about a horizontal axis and L is the length of empty slot 33. With four blocks 38 disposed in slot 33 adjacent the opposed ends thereof (i.e., the center one missing), the effective length of the section becomes $L_2$. The new spring constant is then $$K = \frac{C_1 EI}{L_2^3}$$

If $$L_2 = \frac{L}{2}$$

the spring constant is changed by a factor of eight. With all the shims or blocks in place, of course, the system exhibits no additional flexibility. But it is readily seen that wide variations in the value of the spring constant are possible, thereby permitting a detuning flexibility in large, rigid bedplates heretofore unavailable in the art.

To expedite the insertion and removal of blocks 38, T-sections 30 are provided with jack screws 37 and a heavy gauge lateral extension 36 provided on at least one side of upright portion 32 immediately over slot 33 and extending in a direction parallel with base flange 34. Jack screws 37 are supported in extensions 36 in such a manner that when turned to engage the top surface of flange 34 they remove the pressure on the blocks, caused by the weight of motor-generator set 10, so that blocks 38 can be inserted in and removed from slot 33 at will.

If blocks are used as the means (38) for changing the spring constant of T-section 30 and cab foundation 24, they can be secured in slot 33 by tack welding. If shim packs are used as means 38, jack screws 37 could be used to further hold the shims in place. Other securing means may be employed as well as other means for changing the spring constant and natural frequency of the system. For example, a cylindrical or pin-shaped means could be used in slots 33 and be suitably secured therein without departing from the spirit and scope of the invention.

With the presently disclosed means, the natural frequencies of the overall system involved in shovel cab structures may be readily changed to avoid resonance with motor-generator rotating equipment. Further, in designing and manufacturing motor-generator equipment, the present disclosure provides a means that substantially eliminates consideration of the flexible foundation platforms and the ambiguous complexities of cab structures. This, of course, greatly reduces the cost of designing and fabricating the supporting (bedplate) structures as mentioned earlier. By use of an adjustable spring means 30 integral with the bedplate structure 16, the overall system is converted from a rigidly unchangeable one with a spring constant of unknown quantity to a system having variable spring constants that offer positive corrective action for isolating the rotating equipment 10 from interfering vibrations in the shovel foundation.

Though the invention has been described with a certain degree of particularity, it is to be understood that the disclosure has been made by way of example only and that changes may be made therein without departing from the scope and spirit of the invention.

What is claimed is:

1. An adjustable spring means for a metal, rigid support sturcture supported by mounting pads on a foundation, the adjustable spring means comprising
    an elongated portion of the support stucture formed with an elongated slot provided in the support structure,
    said elongated portion resting on at least one of the mounting pads, and
    rigid blocking means disposed in the elongated slot at locations along the length thereof for changing the effective length of the slot.

2. The adjustable spring means recited in claim 1 in which the rigid support structure is provided with at least one cutout section, and
    a resilient steel insert secured in said cutout section, the elongated slot being provided in said resilient steel insert.

3. The adjustable spring means recited in claim 1 in which jacking means are provided on the support structure for relieving pressure on the blocking means disposed in the elongated slot.

4. In a system employing at least one rotating machine supported on a foundation structure subject to vibrations,
    metal, rigid support structure having elongated slotted portions, the support structure supporting the machine on the foundation structure,
    mounting pads disposed between the support and foundation structures at locations beneath the slotted portions,
    the metal beneath the slotted portion adapted to function as a spring means, and
    blocking means disposed in said slots along the length thereof for changing the spring constant of the system.

References Cited
UNITED STATES PATENTS

| | | | |
|---|---|---|---|
| 1,377,556 | 5/1921 | Bridgman | 248—20 |
| 2,148,937 | 2/1939 | Gerb | 248—20 XR |
| 2,978,213 | 4/1961 | Kass | 248—20 |

JOHN PETO, *Primary Examiner.*